(12) United States Patent
Chauvette et al.

(10) Patent No.: US 6,391,226 B1
(45) Date of Patent: May 21, 2002

(54) COATING OR SEALING COMPOSITION

(75) Inventors: Gaétan Chauvette, St-Hubert; Franois Legendre; Richard Hamelin, both of Trois-Rivières Quest; Guy L. Trudeau, Louiseville, all of (CA)

(73) Assignee: Laboratoires Choisy LTEE, Louiseville (CA)

( * ) Notice: Subject to any disclaimer, the term of this patent is extended or adjusted under 35 U.S.C. 154(b) by 0 days.

(21) Appl. No.: 09/306,295

(22) Filed: May 3, 1999

Related U.S. Application Data

(63) Continuation of application No. PCT/CA96/00726, filed on Nov. 1, 1996.

(51) Int. Cl.$^7$ .................. C09K 15/04; C09D 5/20; C09G 1/00; B05D 1/36; B05D 5/00
(52) U.S. Cl. .................. 252/399; 106/2; 106/6; 427/8; 427/393.6; 427/407.1; 427/412.1; 427/412.4; 427/416
(58) Field of Search .................. 427/393.6, 407.1, 427/412.1, 412.4, 416, 8; 106/2, 6; 252/399

(56) References Cited

U.S. PATENT DOCUMENTS

| | | | | |
|---|---|---|---|---|
| 2,606,165 A | | 8/1952 | Chapin et al. ............. 260/28.5 |
| 3,311,583 A | | 3/1967 | Bearden .................... 260/29.6 |
| 3,328,325 A | | 6/1967 | Zdanowski ................. 260/22 |
| 3,347,811 A | | 10/1967 | Bissot ....................... 260/29.6 |
| 3,352,806 A | | 11/1967 | Hicks ........................ 260/29.4 |
| 3,403,119 A | | 9/1968 | Sullivan et al. ............ 260/28.5 |
| 3,405,084 A | | 10/1968 | Bohac et al. .............. 260/29.6 |
| 3,412,059 A | | 11/1968 | Stickelmeyer et al. ..... 260/28.5 |
| 3,429,842 A | | 2/1969 | Wolstoncroft ............. 260/28.5 |
| 3,457,208 A | | 7/1969 | Sullivan et al. ............ 260/28.5 |
| 3,467,610 A | | 9/1969 | Fiarman et al. ............ 260/22 |
| 3,650,831 A | | 3/1972 | Jungermann et al. ....... 134/27 |
| 3,699,173 A | * | 10/1972 | Osberg et al. ............ 260/316 B |
| 3,808,036 A | | 4/1974 | Zdanowski ........ 117/138.8 UA |
| 3,904,579 A | * | 9/1975 | Braddicks ................. 260/42.46 |
| 3,923,711 A | * | 12/1975 | Pullen .................. 260/28.5 AV |
| 3,933,511 A | | 1/1976 | Heintzelman et al. ......... 106/10 |
| 4,013,607 A | | 3/1977 | Dwyer et al. ........... 260/29.6 H |
| 4,017,662 A | * | 4/1977 | Gehman et al. ............. 428/443 |
| 4,067,840 A | | 1/1978 | Wolf ..................... 260/29.6 R |
| 4,070,510 A | | 1/1978 | Kahn ..................... 427/385 R |
| 4,071,645 A | | 1/1978 | Kahn ......................... 427/340 |
| RE29,596 E | * | 3/1978 | Strobel .................... 260/308 B |
| 4,699,885 A | | 10/1987 | Melpolder et al. ............ 436/39 |
| 4,702,966 A | * | 10/1987 | Farrell et al. ................ 428/500 |
| 4,714,657 A | * | 12/1987 | Quinn et al. ................. 428/412 |
| 4,793,988 A | | 12/1988 | Casey et al. ................. 424/7.1 |
| 4,820,647 A | | 4/1989 | Gibbons ....................... 436/79 |
| 5,032,178 A | | 7/1991 | Cornell ......................... 106/35 |
| 5,110,492 A | | 5/1992 | Casey ........................... 252/90 |
| 5,196,518 A | * | 3/1993 | Langfeld et al. ............. 534/583 |
| 5,234,974 A | | 8/1993 | Calhoun et al. ............. 523/169 |
| 5,618,860 A | * | 4/1997 | Mowrer et al. ............. 427/387 |
| 5,693,390 A | * | 12/1997 | Inagaki et al. ............. 428/35.7 |
| 5,736,496 A | * | 4/1998 | Durbut et al. .............. 510/235 |

FOREIGN PATENT DOCUMENTS

| | | |
|---|---|---|
| EP | 0 672 732 A1 | 9/1995 |
| FR | 2528860 | 6/1983 |

\* cited by examiner

*Primary Examiner*—Michael Barr
(74) *Attorney, Agent, or Firm*—Darby & Darby

(57) ABSTRACT

A coating or sealing composition comprising:

(a) at least one agent adapted to form a coat or seal when applied onto a substrate;

(b) at least one sensor adapted to reveal the presence of the coat or seal under determined conditions; and (c) a volatile excipient in which the above and all other ingredients of the composition are dispersed or dissolved, p1 characterized in that said composition further comprises:

(d) at least one UV stabilizer and/or antioxidant.

26 Claims, No Drawings

COATING OR SEALING COMPOSITION

This is a continuation of international Application PCT/CA96/00726, filed Nov. 1, 1996.

BACKGROUND OF THE INVENTION a) Field of the Invention

The invention relates to an improved composition for coating or sealing a substrate (especially a floor). This composition presents a high degree of stability during the shelflife and the useful life of the coats or sealers and is advantageously provided with at least one sensor (e.g. a color precursor) that turned colored under determined conditions.

b) Brief Description of the Related Art

It is known in the art that particular attention and a well define methodology is required to properly achieve a uniform and complete stripping of a worn coat or sealer applied on a substrate (such as a floor). Indeed, it is compulsory before applying a new coating or sealer, to completely remove the old one.

Up to now to be sure that all the old coating or sealer is removed it was necessary to repeat a stripping process twice or several times. Each subsequent stripping must be carried out on all the surface of the substrate initially stripped, and this only for the removal of small spots of coat remains or sealer remains that still adhere to said substrate and are very hard for sight detections (even for professionals). Of course, this drawback is still more accentuated for less trained personnel. Said stripping may be carried out with a chemical remover (e.g., an alkaline solution containing organic solvents) and/or with mechanical devices (especially those using floor maintenance pads). Such a repetition of the stripping processes, is time consuming, product consuming and/or energy consuming. Furthermore, repetitive stripping may result into an excessive worn of the substrate (especially when a mechanical action is exerted on the surface of the substrate) that will contribute to shorten the useful life of said substrate. Example of said substrate may consist of wood, vinyl, asbestos, terrazzo, etc.) This means lost of quality and efficiency.

To overcome this drawback, it was proposed in the art to add a chemical sensor directly in sealer and/or coating compositions. More particularly, it was known in the art to embody coating or sealing compositions provided with a color indicator. Examples of such compositions are described in U.S. Pat. Nos. 4,070,510 and 4,071,645.

Sensors that are actually incorporated in sealers and/or floor finish and/or spray buffing solution will be revealed by chemical activators intendedly added and optimized in stripper mixtures or any related floor care product. Both chemical sensors and chemical activators are commercially available in large quantities at reasonable cost and lead times.

It is also possible in the art to use different sensors in the sealer and in the floor finish. An adjustment of the concentration of the stripper mixture could then allow to remove the floor finish while allowing to keep intact the sealer. For example, the use of a cleaner excessively alkaline or concentrated will be immediately revealed by the sensor contained in the floor finish.

However, prior art compositions embedding color indicators show the drawbacks of having a bad stability during the useful life of the coating or sealers. Indeed, these coats and seals show, as a function of time, a deterioration of their optical properties and sensors become to turn colored or fluorescent. Also, sensors may be altered or reacted with constituents of the coating or the sealer, so as they cannot turn colored or fluorescent when put into a determined condition susceptible to transform the sensor into a colored or fluorescent pigment.

Therefore, there is a strong need for a coating or sealing composition (especially a clear coating or sealing composition) that has stable optical properties during its shelf life and its useful life, and that, when sensors are present therein, is still capable of turned colored when necessary (i.e., when it is required to remove it from the substrate covered or sealed) to make easier a complete stripping of the coating or sealer from the coated or sealed substrate.

SUMMARY OF THE INVENTION

A first object of the present invention is to provide a coating composition or sealing composition (advantageously a clear floor finish composition) that will have an extended shelf life and useful life without suffering deterioration of its color (e.g., for the clear floor finish, it remains clear) and, when it contains at least one sensor (for example a color precursor), it is still capable to have its sensor activated to turn colored under determined conditions (for example under an alkaline treatment).

Another object of the present invention is to provide a coating composition or sealing composition (advantageously a clear floor finish composition) that will be very easy to remove completely, once sensor is turned colored after having been subjected to determined conditions.

Another object of the present invention is to provide a composition (advantageously a clear floor finish composition) that improve quality and efficiency of floor are maintenance systems.

Another object of the present invention is to provide the following items:

An efficiency indicator for stripping mixtures.

An indicator to control the washing conditions for floor finishes (to avoid overdosage of alkali in the cleaner).

An indicator to specify the presence of residual floor finish that are normally undetected.

An indicator for different layers of coats on a surface (e.g., different sensors in the sealer and the floor finish, or different sensors between the first and last layers of a coating to reveal and measure the wear of the stack of layers).

A interactive visual monitoring system allowing a reactant normally contained in a maintenance product (e.g. a cleaning formulation obtained from a concentrate) to activate sensors if the dilution of the concentrate is unsufficient, or a reactant normally contained in a stripping solution to reveal the identity of a coat located at the top of a stack of coats. This interactive visual monitoring system may further allow to measure, specify, reveal and control visually (instantly or periodically) the quality of a work (e.g. a stack of coatings on a floor) without requiring additional investment and while respecting modern application techniques, the intervening parties and the environment.

A visual monitoring system that is very simple, unavoidably leads to a job well done with a higher accuracy, a sustained productivity and substantial saves, and allows a reduction of the burden of employees and allows an efficient self control.

Means for rendering safer the stripping processes by revealing the presence of emulsions on the floor (which is slippery).

An indicator for applying a floor finish (the floor finish is colored when applied and turns clear when set).

An indicator where a pressure was applied on the floor finish (thanks to sensors activated by pressure).

Sensors may be used in connection with a wide variety of products, such as stripping mixtures, floor cleaners, surface neutralizers, soaps (e.g., hand soaps, shower soaps, ect.), disinfectants, dishes or clothes cleaning products, industrial products.

Another object of the present invention is to provide a coating composition or sealing composition that is stable for a period of at least one year with respect to the characteristics thanks to the incorporation therein of at least one chemical and/or UV stabilizer and/or antioxidant. Preferably, this stability is noted for temperatures ranging from −18° C. to 50° C.

Another object of the present invention is to provide a layer of coating or sealing or a stack of layers of coating or sealing, each layer being obtained by applying a composition according to the invention on a substrate by any appropriate means, said layer being stable for a period of at least one year with respect to the characteristics thanks to the incorporation in each layer of at least one chemical and/or UV stabilizer and/or antioxidant.

Examples of means suitable for applying a coating according to the invention may be selected from the group consisting of brushes, roller applicators, flat mops, floor clothes, clothes, sponges, sprinklers, sprayers, scrapers, waxing machines, and all other well known applicators.

Another object of the present invention is the selection of chemical or biochemical or biological sensors (optical, olfactive, sound, ect.).

Sensors are advantageously uniformly distributed in a polymer matrix and preferably stabilized for energy levels by proper substances (phenolic or any other materials).

Sensors may also consist of fluorescent sensors. For example, fluorescent sensors may be selected from the group consisting of Beta Naphthol and Coumarin.

Another object of the present invention is a method for protecting a surface, comprising the application of several coats of floor finishes on a substrate to define a stack of coats, at least one coat at the base of the stack defining a composition as defined hereinabove, at least one coat at the top of the stack defining a composition as defined hereinabove, where the sensor in the coat at the base of the stack is different than the sensor in the coat at the top of the stack.

Another object of the present invention is a method for measuring the wear of a floor coating or sealing, especially a floor coating or sealing comprising a stack of at least two coats of distinct coating or sealing material. Each coat embeds a distict sensor (i.e. providing once revealed distinct colors). This method comprise a first step according to which a revealer is applied on a floor coating or sealing to activate sensors located in the coat located at the top of the stack, a second step for determining whether or not portions of the top coat or seal of the floor coating or sealing disappear (i.e. a distinct color corresponding to the sensors of the underneath coat will be revealed), and then a third step according to which an eraser is applied on the coat or seal at the top of the stack to disactivate the sensors.

More particularly, the invention advantageously relates to a method for measuring the wear of a floor coating or sealing comprising at least one coat or seal embedding a sensor, wherein:

A) when the sensor is located in a coat or seal normally at the top of a stack of at least two coats or seals, it comprises the following steps:

applying a revealer on the floor coating or sealing to activate the sensor located in the coat or seal located at the top of the stack, determining whether or not portions of the top coat or seal have disappear (i.e. lack of coloration), and applying an eraser on the floor coating or sealing to disactivate the sensor.

B) when the sensor is located in a coat or seal underneath the one normally at the top of a stack of at least two coats or seals, it comprises the following steps:

applying a revealer on the floor coating or sealing to activate the sensor of any portion of the coat or seal now defining a top surface of the floor coating or sealing in replacement of a disappear portion of the initial top coat or seal, determining whether or not portions of the top coat or seal have disappear (i.e. coloration), and applying an eraser on the floor coating or sealing to disactivate the sensor if this latter has been activated.

Advantageously, the revealer consist of a formulation containing in an excipient, a compound that will react with the sensor to activate it (i.e. turn it colored). For example, the revealer may be a basic solution or emulsion.

Advantageously, the eraser may consist of a formulation containing in an appropriate excipient, a compound that will react with the sensor to disactivate it (i.e. return it to its original color, normally to become colorless, transparent). For example, the eraser may be an acidic solution or emulsion.

Also, the invention advantageously relates to a method for measuring the wear of a floor coating or sealing comprising at least two coats or seals embedding a sensor, the sensor of one coat or seal giving a color distinct from the one of the other coat or seal, wherein it comprises the following steps:

applying a revealer on the floor coating or sealing to activate the sensor of any coat or seal portions located at the top of the stack, determining whether or not portions of the top coat or seal disappear (i.e. contrasting coloration), and applying an eraser on the floor coating or sealing to disactivate the sensor.

Of course, once portions of floor coating or sealing are identified as being devoid of the top coat or seal, it may be either possible to apply a fresh replacement coat or seal only on identified portions, or to decide to replace the whole floor covering.

Also, the invention advantageously relates to a method for determining whether or not a maintenance formulation has an appropriate concentration, said method comprising applying a small portion of the maintenance formulation on a floor coating or sealing comprising a top coat or seal provided with sensor embedded therein, determining whether or not the floor coating or sealing turn colored, an then if there is no change of coloration directly using the maintenance formulation, or if color appears, applying an eraser on the colored spot of the floor covering or sealing to disactivate the sensor, an readjusting the concentration of the maintenance formulation.

For example, the substrate may consist of a tile, terazzo, linoleum, vinyl composition flooring, stone, concrete, ect.

Preferably, at least one lower coat is merely intended for protection while at least one upper coat is merely intended for gloss, wear properties, response to buffing, dirt penetration, slip control, ect.

The present invention relates to -a coating or sealing composition of the type comprising:
(A) a material comprising:
   at least one agent adapted to form a coating or sealer, and
   at least one additive defining a chemical and/or a U.V. stabilizer and/or antioxidant; and
(B) a volatile excipient in which the above ingredients are either dispersed or dissolved.

Advantageously, the invention relates to a composition defining a clear coating or sealer, and comprising:
(A) from 1 to 60% by weight of a material comprising: at least one agent adapted to form a clear coating or sealer; and at least one additive defining a U.V. stabilizer and/or antioxidant; and
(B) from 99 to 40% by weight of a volatile excipient in which the above ingredients are either dispersed or dissolved.

Advantageously, the U.V. stabilizers and/or anti-oxidants may be selected from the group consisting of diterbutylparacresol, 4-dodecyloxy-2-hydroxybenzophenone, resorcinol monobenzoate and resorcinol.

Advantageously, the additive defining a U.V. stabilizer and/or antioxidant may at least comprise a mixture of diterbutylparacresol and resorcinol. Preferably, the diterbutylparacresol and the resorcinol are respectively in such an amount to represent from 0.00001 to 150 g per liter of resulting composition without the U.V. stabilizer and/or antioxidant.

Advantageously, the additive defining a U.V. stabilizer and/or an aptioxidant may represents from 0.0005% to 0.2% (more preferably from 0.005% to 0.1%) by weight with respect to the total weight of the composition.

Preferably, the agent adapted to form a coating or sealer may be selected from the group consisting of
   polymers, coalescents, plasticizers, waxes, alkali soluble resins and mixtures thereof.

Particularly preferred polymers may be selected from the group consisting of acrylic polymer emulsion, modified acrylic zinc complexes polymer latex, modified acrylic zinc completed polymer emulsion, acrylic styrene metal cross linked copolymers emulsion, styrene acrylic metal cross linked copolymers emulsion, acrylic styrene copolymers emulsion, styrene acrylic copolymers, mixture of any of those with urethane and fluoroacrylic polymers.

Particularly preferred coalescents may be selected from the group consisting of monomethyl ether of diethylene glycol, monoethylether of diethylene glycol and monomethylether of dipropylene glycol.

Particularly preferred permanent plasticizers may be selected from the group consisting of dibutyl phthalate, triphenylphosphate and tributoxyethyl phosphate.

Particularly preferred waxes may be selected from the group consisting of polyolefin waxes and ester of polyolefin waxes.

Particularly preferred waxes may be selected amongst carnauba and other natural waxes.

Particularly preferred alkali soluble resins may be selected from the group consisting of acrylic interpolymer of copolymer metal, ionic cross linked type or alkali soluble resins or acrylic resin or acrylic terpolymer resins. Examples of particularly preferred alkali soluble resins may be selected from the group consisting of styrene maleic anhydride aqueous ammoniacal solution.

Particularly preferred excipients may be selected from the group consisting of water, coalescent mixtures of solvents and azeotropic mixtures of solvents.

Advantageously, additives may further comprise at least one sensor such as a clear filler defining a color precursor adapted to reveal the presence of the coating or sealer under determined conditions.

Sensors may define color precursors, odor precursors, sound precursors etc. Preferably, sensors are color precursors (including colors revealed by fluorescence). They are advantageously uniformly distributed in the coat or seal and they may be stabilized if necessary for energy revel with proper substances (phenolic or any other materials).

A particularly preferred clear filler defining a color precursor may consist of phenolphthalein and is adapted to become colored (including by fluorescence) under appropriate pH conditions.

A particularly preferred clear filler defining a color precursor may consist of thymolphthalein and is adapted to become colored under appropriate pH conditions.

A particularly preferred clear filler defining a color precursor may consist of ortho-cresolphthalein and is adapted to become colored under appropriate pH conditions.

Other particularly preferred clear filler may define a color precursor (by fluorescence) and may be selected from the group consisting of Beta Naphthol and Coumarin.

Advantageously, the clear filler defining a color precursor adapted to reveal the presence of the coating under determined conditions may be in such an amount to represent from 0.00001 to 150 g per liter of resulting composition without the clear filler and U.V. stabilizer and/or antioxidant. More particularly, the clear filler defining a color precursor may represent from 0.025% to 0.5% by weight (especially from 0.05% to 0.25% by weight) of the total weight of the composition to obtain.

Advantageously, the composition may further comprises a chemical stabilizer, preferably a buffer to control the pH of the coating or sealer. A particularly preferred buffer may consist of a mixture of citric acid/sodium citrate, trishydroxymethyl amino methane/HCl, sodium methylate/phenyl acetic acid, borax/HCl and 2,4,6-trimethylpyridine, and preferably of borax/HCl.

Advantageously, the pH of the composition may vary from 7.2 to 10.5, more particularly from 8.1 to 8.8. When borax mixture is used, the pH is preferably of 8.2.

Advantageously, the buffer may be in such an amount to represent from 0.00001 to 150 g per liter of resulting coating or sealing composition without buffer and U.V. stabilizer and/or antioxidant and clear filler. Preferably, the buffer represents from 0.5% to 4% by weight (especially from 1.5% to 2.5% by weight) of the total weight of the composition.

DESCRIPTION OF PREFERRED EMBODIMENTS

The present invention will be better understood, in the light of the following examples.

EXAMPLE 1

Prior Art

A floor finish having the following formulation has been prepared:

| | INGREDIENTS | WEIGHT % |
|---|---|---|
| 1 | Deonized water | 58.05 |
| 2 | Surfactant[1] (1%) | 0.89 |
| 3 | Anti-foaming agent[2] | 0.01 |
| 4 | Diethylene glycol monoethyl ether | 3.74 |
| 5 | Dibutylphtalate | 0.94 |
| 6 | Tributoxy ethyl phosphate | 0.94 |
| 7 | 5-chloro-2-methyl-4 isothiazolin-3-one (1.15%) | 0.03 |
| 8 | 2-methyl-4-isothiazolin-3-one (0.35%) | 0.03 |
| 9 | Aqueous acrylic zinc crosslink-polymer mulsion (38%)[3] | 29.57 |
| 10 | Ethylene-acrylic acid copolymer emulsion[4] | 4.19 |
| 11 | Non ionic polyethylene emulsion[5] | 1.41 |
| 12 | Phenolphthalein | 0.20 |
| | TOTAL | 100.00 |

[1]FLUORAD FC-120 ® Anionic type fluorocarbon surface active agent, supplied by 3M.
[2]DEE FO PI 35 ® Siloxane glycol copolymer, supplied by Ultra Additives Incorporated.
[3]RHOPLEX B-924 ® supplied by Rohm and Haas Co.
[4]AG-540 ® supplied by Allied Chemical Co.
[5]AC-392 ® supplied by Allied Chemical Co.

Preparation process at ambiant temperature. (20–25° C.)
A) Use a first stainless steel tank.
B) Add 80% of water directly in the tank.
C) Start a mechanical stirrer for stirring the content of the first stainless steel tank.
D) Add items 4, 5 and 6, in a weight in a second stainless steel tank, mix the content and then transfer in the first stainless steel tank.
E) Add a part of the remaining water in the second stainless steel tank in order to clean it, and then pour the content thereof in the first stainless steel tank.
F) Add item 2 directly in the first stainless steel tank.
G) Prepare an aqueous solution of item 3 and after stirring pours said solution in the first stainless steel tank.
H) Prepare an aqueous solution of item 7 and 8, and after stirring pour said solution in the first stainless steel tank.
I) Add item 9 directly in the first stainless steel tank.
J) Add item 10 directly in the first stainless steel tank.
K) Add item 11 directly in the first stainless steel tank.
L) Add item 12 in 2 liters of NaOH 0.1N, dissolve and pour in the first stainless steel tank.
M) Continue stirring for 2 hours.
Then the resulting mixture was applied on a substrate (an vinyl-asbestos tile) and allowed to set.

EXAMPLE 2

A floor finish having the following formulation has been prepared:

| | INGREDIENTS | WEIGHT % |
|---|---|---|
| 1 | Deonized water | 58.19 |
| 2 | Surfactant[1] (1%) | 0.89 |
| 3 | Anti-foaming agent[2] | 0.01 |
| 4 | Diethylene glycol monoethyl ether | 3.74 |
| 5 | Dibutylphtalate | 0.94 |
| 6 | Tributoxy ethyl phosphate | 0.94 |
| 7 | 5-chloro-2-methyl-4 isothiazolin-3-one (1.15%) | 0.03 |
| 8 | 2-methyl-4-isothiazolin-3-one (0.35%) | 0.03 |
| 9 | Aqueous acrylic zinc crosslink polymer emulsion (38%)[3] | 29.57 |
| 10 | Ethylene acrylic acid copolymer emulsion[4] | 4.19 |
| 11 | Non ionic polyethylene emulsion | 1.41 |
| 12 | Phenolphthalein | 0.05 |
| 13 | Ditert butyl paracresol | 0.01 |
| | TOTAL | 100.00 |

[1]FLUORAD FC-120 ® Anionic type fluorocarbon surface active agent, supplied by 3M.
[2]DEE FO PI 35 ® Siloxane glycol copolymer, supplied by Ultra Additives Incorporated.
[3]Thoplex b-984 ® supplied by Rohm and Haas Co.
[4]AG-540 ® supplied by Allied Chemical Co.
[5]AC-392 ® supplied by Allied Chemical Co.

Preparation process at ambient temperature (20–25° C.).
A) Use a first stainless steel tank.
B) Add 80% of water directly in the tank.
C) Start a mechanical stirrer for stirring the content of the first stainless steel tank.
D) Add items 4, 5 and 6, in a weight in a second stainless steel tank, mix the content and then transfer in the first stainless steel tank.
E) Add a part of the remaining water in the second stainless steel tank in order to clean it, and then pour the content thereof in the first stainless steel tank.
F) Add item 2 directly in the first stainless steel tank.
G) Prepare an aqueous solution of item 3 and after stirring pour said solution in the first stainless steel tank.
H) Prepare an aqueous solution of items 7 and 8, and after stirring pour said solution in the first stainless steel tank.
I) Add item 9 directly in the first stainless steel tank;
J) Add item 10 directly in the first stainless steel tank.
K) Add item 11 directly in the first stainless steel tank.
L) Add item 12 and 13 in 2 liters of NaOH 0.1N, dissolve and pour in the first stainless steel tank.
M) Continue stirring for 2 hours.
Then the resulting mixture was applied on a substrate (an vinyl-asbestos tile) and allowed to set.

EXAMPLE 3

A floor finish having the following formulation has been prepared:

| | INGREDIENTS | WEIGHT % |
|---|---|---|
| 1 | Deonized water | 56.31 |
| 2 | Borax buffer adjusted to pH 8,2 | 1.88 |
| 3 | Surfactant[1] (1%) | 0.89 |
| 4 | Anti-foaming agent[2] | 0.01 |
| 5 | Diethylene glycol monoethyl ether | 3.74 |
| 6 | Dibutylphtalate | 0.94 |
| 7 | Tributoxy ethyl phosphate | 0.94 |
| 8 | 5-chloro-2-methyl-4 isothiazolin-3-one (1.15%) | 0.03 |
| 9 | 2-methyl-4-isothiazolin-3-one (0.35%) | 0.03 |

-continued

| | INGREDIENTS | WEIGHT % |
|---|---|---|
| 10 | Aqueous acrylic zinc crosslink polymer emulsion[(4)] | 29.57 |
| | Ethylene acrylic acid copolymer emulsion[(4)] | 4.19 |
| 12 | Non ionic polyethylene emulsion[(5)] | 1.41 |
| 13 | Phenolphthalein | 0.05 |
| 14 | Ditert butyl paracresol | 0.01 |
| | TOTAL | 100.00 |

[(1)]FLUORAD FC-120 ® Anionic type fluorocarbon surface active agent, supplied by 3M.
[(2)]DEE FO PI 35 ® Siloxane glycol copolymer, supplied by Ultra Additives Incorporated.
[(3)]Rhoplex B-924 ® supplied by Rohm and Haas Co.
[(4)]AG-540 ® supplied by Allied Chemical Co.
[(5)]AC-392 supplied by Allied Chemical Co.

Preparation process at ambiant temperature. (20–25° C.)
A) Use a first stainless steel tank.
B) Add 80% of water directly in the tank.
C) Start a mechanical stirrer for stirring the content of the first stainless steel tank.
D) Add items 5, 6 and 7, in a weight in a second stainless steel tank, mix the content and then transfer in the first stainless steel tank.
E) Add a part of the remaining water in the second stainless steel tank in order to clean it, and then pour the content thereof in the first stainless steel tank.
F) Add item 2 directly in the first stainless steel tank.
G) Prepare an aqueous solution of item 3 and after stirring pour said solution in the first stainless steel tank.
H) Add item 4 directly in the first stainless steel tank.
I) Prepare an aqueous solution of items 8 and 9, and after stirring pour said solution in the first stainless steel tank.
I) Add item 10 directly in the first stainless steel tank.
J) Add item 11 directly in the first stainless steel tank.
K) Add item 12 directly in the first stainless steel tank.
L) Add items 13 and 14 in 2 liters of NaOH 0.1N, dissolve and pour in the first stainless steel tank.
M) Continue stirring for 2 hours.

Then the resulting mixture was applied on a substrate (an vinyl-asbestos tile) and allowed to set.

This formulation is merely made by mixing of various ingredients in a mixer. Then the resulting mixture was applied on a substrate and allowed to set.

TABLE

| | EXAMPLE 1 | | EXAMPLE 2 | | EXAMPLE 3 | |
|---|---|---|---|---|---|---|
| COLOR APPEARANCE AFTER (30 DAYS) | Yellow-beige (Prior Art) Pantone 5245C | | White | | White | |
| Gloss*[1] (n = 6) | x 20° C. | 60° C. | x 20° C. | 60° C. | x 20° C. | 60° C. |
| 1 coat | 3.8 | 19.4 | 5.9 | 27.8 | 6.7 | 30.2 |
| 2 coats | 12.7 | 42.7 | 14.5 | 46.5 | 18.4 | 53.9 |
| 3 coats | 16.8 | 49.2 | 26.6 | 59.1 | 38.9 | 77.5 |
| Sensor activity (1 year) | Very bad appearance Sensor chemically degraded | | Good appearance Full red Color activity | | Good appearance Full red Color activity | |
| Commercial validity | NO | | YES | | YES | |

*[1]Lost of gloss for Example 1 is important but the yellow beige appearance associated makes it look like a real worn floor finish. It has absolutely no commercial value at all.

From those results, double stabilization by both buffer and antioxidant is even better. One can even appreciate better gloss values in Example 3. In terms of gloss value, the measurement at 20° represent a depth of gloss and the 60° is the brightness perceived by the customer walking in a hall.

For commercial product, it is very important to sell a white and transparent floor finish providing high gloss associated to cleanliness of the coated surface. Example 2 and more particularly Example 3 really meet the above mentioned specifications. The worn appearance generated by chemical sensor degradation in Example 1 make this floor finish of absolutely no commercial value.

What is claimed is:
1. An aqueous floor coating or sealing composition having long term stability and glossiness, the composition comprising:
   (a) at least one agent to form a coat or seal when applied onto a substrate;
   (b) at least one sensor to reveal the presence of the coat or seal under determined conditions; and
   (c) a volatile excipient comprising water and in which the above and all other ingredients of the composition are dispersed or dissolved,
   characterized in that said composition further comprises:
   (d) at least one antioxidant, and
   (e) at least one buffer to maintain the pH of the coating or sealing composition between 7.2 and 10.5,
   wherein the sensor in the composition does not chemically degrade after 1 year.
2. The composition of claim 1, characterized in that:
   said at least one agent (a) is selected amongst those that can form a coat or seal that is clear;
   the composition contains from 1 to 60% by weight of said at least one agent (a), said at least one sensor (b) and said antioxidant (d); and
   said composition contains from 99 to 40% by weight of said volatile excipient (c).
3. The composition of claim 1, characterized in that the antioxidant (d) is di-tert-butylparacresol.
4. The composition according to claim 1, wherein said at least one agent (a) is selected from the group consisting of polymers, polymer emulsions, coalescents, plasticizers, waxes, alkali soluble resins and mixtures thereof.
5. The composition according to claim 4, characterized in that:
   the polymer in the polymer emulsion is selected from the group consisting of acrylic polymers; acrylic polymers complexed with zinc; copolymers of styrene and acrylic nonomers; and metal crosslinked copolymers of styrene and acrylic monomers;
   the coalescents are selected from the group consisting of monomethyl ether of diethylene glycol, monoethylether of diethylene glycol and monomethylether of dipropylene glycol;
   the plasticizers are selected from the group consisting of dibutyl phthalate, triphenylphosphate and tributoxyethyl phosphate;

the waxes are selected from the group consisting of polyolefin waxes and esters of polyolefin waxes; and the alkali soluble resins are selected from the group consisting of acrylic copolymers complexed with a metal, ionic cross linked resins, and acrylic terpolymer resin.

6. The composition according to claim 1, wherein said at least one agent (a) is selected from the group consisting of carnauba waxes and aqueous ammoniacal solutions of styrene maleic anhydride.

7. The composition according to claim 1, wherein said at least one sensor (b) is a color precursor selected from the group consisting of phenolphthalein, thymolphthalein and orthocresolphthalein.

8. The composition according to claim 7 characterized in that said sensor is present in an amount ranging from 0.00001 to 150 g per liter of said composition without the sensor and antioxidant.

9. The composition according to claim 1, wherein:

the buffer is present in an amount ranging from 0.00001 to 150 g per liter of said composition without said sensor and antioxidant.

10. The composition according to claim 9, wherein the buffer consists of a mixture of borax and HCl and the pH is 8.2.

11. A method for protecting a surface comprising the step of applying several coats of floor finishes onto the surface to form a stack of coats thereon, said stack having a bottom portion and a top portion, characterized in tat at least one coat in the bottom portion of the stack and at least one coat in the top portion of the stack are independently comprised of the floor coating or sealing composition as claimed in claim 1, wherein a sensor present in at least one layer of the top portion of the stack is different than a sensor present in at least one layer of the bottom portion of the stack.

12. A method for measuring the wear of a floor coating or sealing comprising a plurality of coats or seals forming a stack, at least one of said coats or seals being made of a composition as claimed in claim 1 which incorporates a sensor, characterized in that:

a) when the sensor is incorporated in the coat or seal on top of the stack, said method comprises the following steps:

applying a revealer on the floor coating or sealing to activate the sensor located in the coat or seal on top of the stack, determining by means of said activated sensor whether or not portions of the top coat or seal have disappeared, and applying an eraser on the floor coating or sealing to deactivate the sensor; and b) when the sensor is incorporated in one of the coats or seals that are underneath the one on top of the stack, said method comprises the following steps:

applying a revealer on the floor coating or sealing to activate the sensor of any portion of the coat or seal that incorporates said sensor and may now have become on top of the floor coating or sealing because of wear and disappearance of the top coat or seal, determining by means of said activated sensor whether or not portions of the top coat or seal have disappeared, and applying an eraser on the floor coating or sealing to deactivate the sensor if said sensor has been activated because of the wear and disappearance of the top coat or seal.

13. A method for measuring the wear of a floor coating or sealing comprising at least two coats or seals made of a composition as claimed in claim 1, each of said coats or seals incorporating a sensor which is a color precursor, the sensor of one of said coats or seals having when activated a color distinct from the one of the other coats or seals, said method comprising the following steps:

applying a revealer on top of the floor coating or sealing to activate the sensor contained in the coat or seal extending on top of the stack, determining by means of said sensor which is activated or not whether or not portions of the original top coat or seal have disappeared, applying an eraser on the floor coating or sealing to deactivate the sensor.

14. A method for determining whether or not a floor maintenance formulation has an appropriate concentration, said method comprising the steps of:

applying a small portion of the maintenance formulation onto a floor coating or sealing according to claim 1 comprising a top coat or seal incorporating a color precursor-containing sensor reactive to the concentration of said maintenance formulation;

determining whether or not the floor coating or sealing turns colored, and if there is no change of coloration, completing the application of the maintenance formulation or, if a coloration appears, applying an eraser on the colored portions of the floor coating or sealing to deactivate the sensor, adjusting the concentration of the maintenance formulation and applying the adjusted maintenance formulation onto the floor coating or sealing.

15. The method of claim 4, characterized in that the floor maintenance formulation is an alkali cleaner.

16. A method for determining whether a floor coating or sealing comprising a plurality of coats or seals forming a stack has been properly removed after application of a stripping mixture, the coats or seals independently comprising the composition of claim 1, the sensor of each coat or seal activated in the presence of the stripping mixture, the method comprising the steps of (a) applying the stripping mixture to the floor to activate the sensor contained in any remaining portion of the floor coating or sealing, (b) determining by means of said sensor which is activated or not whether or not portions of the original floor coating or sealing remain.

17. A method for determining whether a floor finish has been properly applied, the method comprising the step of applying a composition as claimed in claim 1 as said floor finish, the sensor of the composition being colored when applied and turning clear when set.

18. The composition of claim 1, wherein the sensor becomes colored by fluorescence and is selected from the group consisting of phenolphthalein, Beta-Naphthol and Coumarin.

19. The composition of claim 1, wherein the buffer is selected from the group consisting of mixtures of citric acid and sodium citrate; mixtures of trishydroxymethyl amino methane and HCl; mixtures of sodium methylate and phenylacetic acid; mixtures of borax and HCl; and mixtures of borax, HCl, and 2,4,6-trimethylpyridine.

20. The composition of claim 4, wherein the polymer is a styrene acrylic copolymer.

21. The composition according to claim 19, characterized in that said UV stabilizer is resorcinol and said antioxidant (d) is di-tert-butylparacresol.

22. The composition according to claim 21, characterized in that di-tert-butylparacresol and resorcinol are respectively present in amounts ranging from 0.00001 to 150 g per liter of said composition.

23. The composition of claim 1, further comprising a UV stabilizer.

24. The composition of claim 23, wherein the UV stabilizer is selected from the group consisting of 4-dodecyloxy-2-hydroxybenzophenone, resorcinol monobenzoate, resorcinol and their mixtures.

25. The composition of claim 23, wherein said sensor is present in an amount ranging from 0.00001 to 150 g per liter of said composition without the sensor, UV stabilizer, and antioxidant.

26. The composition of claim 23, wherein the buffer is present in an amount ranging from 0.00001 to 150 g per liter of said composition without said sensor and UV stabilizer and/or antioxidant.

* * * * *

UNITED STATES PATENT AND TRADEMARK OFFICE
CERTIFICATE OF CORRECTION

PATENT NO.     : 6,391,226 B1
DATED          : May 21, 2002
INVENTOR(S)    : Gaetan Chauvette et al.

It is certified that error appears in the above-identified patent and that said Letters Patent is hereby corrected as shown below:

<u>Title page,</u>
Item [75], Inventors, please correct the 2$^{nd}$ inventor's name: "Franois Legendre;"
to -- François Legendre; --.

Item [22] Filed, please change the filing date from: "May 3, 1999" to
-- April 30, 1999 --.

Signed and Sealed this

Twenty-first Day of January, 2003

JAMES E. ROGAN
*Director of the United States Patent and Trademark Office*